US006944862B2

(12) United States Patent
Caggese et al.

(10) Patent No.: US 6,944,862 B2
(45) Date of Patent: Sep. 13, 2005

(54) METHOD AND SYSTEM FOR SCHEDULING EXECUTION OF ACTIVITIES

(75) Inventors: Sergio Caggese, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 10/042,078

(22) Filed: Jan. 8, 2002

(65) Prior Publication Data

US 2002/0194247 A1 Dec. 19, 2002

(30) Foreign Application Priority Data

Jun. 15, 2001 (GB) .............................. 0114616

(51) Int. Cl.[7] .............................................. G06F 9/46
(52) U.S. Cl. ..................................... 718/102; 718/104
(58) Field of Search .............................. 718/100, 101, 718/102–104, 105; 700/99–101

(56) References Cited

U.S. PATENT DOCUMENTS

| | | | | |
|---|---|---|---|---|
| 5,764,981 A | * | 6/1998 | Brice et al. ................. | 718/101 |
| 5,812,844 A | * | 9/1998 | Jones et al. ................. | 718/104 |
| 6,289,368 B1 | * | 9/2001 | Dentler et al. .............. | 718/101 |
| 6,385,638 B1 | * | 5/2002 | Baker-Harvey ............. | 718/107 |

FOREIGN PATENT DOCUMENTS

JP  4-127323 A  4/1992

OTHER PUBLICATIONS

Moullec et al. "A scheduleing framework for system–level estimation" 2000 IEEE, pp. 277–280.*
Perkovic et al. "Randomization, speculation, and adaptation in batch schedulers" 2000 IEEE, pp. 1–11.*
Chavez et al. "Challenger: a multi–agent system for distributed resource allocation" 2000 ACM, pp. 323–331.*

* cited by examiner

*Primary Examiner*—St. John Courtenay, III
*Assistant Examiner*—Van Hoa Nguyen
(74) *Attorney, Agent, or Firm*—Duke W. Yee; Jeffrey S. LaBaw; Theodore D. Fay, III (57) ABSTRACT

A method (300) and system for scheduling execution of activities, such as jobs of a batch processing. An estimated duration of each job is predicted (365–367) as a running average of the measured durations of completed instances of the job executed previously. The method of the invention uses historical data to identify (375–385) repeatable patterns for the job duration; for example, a decision tree is inducted using the completed instances of the job as training examples. The decision tree is applied for classifying (325) each new instance of the job to be executed, according to its planned time of execution; the estimated duration of the job is revised (330) using an adjustment factor associated with the class assigned to the new instance of the job.

19 Claims, 5 Drawing Sheets

METHOD AND SYSTEM FOR SCHEDULING EXECUTION OF ACTIVITIES

FIELD OF THE INVENTION

The present invention relates to a method and system for scheduling execution of activities.

BACKGROUND OF THE INVENTION

Scheduling methods are commonly used in several applications, such as for managing a series of jobs in a batch processing. Typically, scheduling involves building a plan consisting of a flow of jobs structured in a specified sequence, which is used to submit and control their execution. The building of the plan requires an accurate prediction of the duration of each job.

A solution known in the art is that of measuring an actual duration of each job when it is executed, and using this time as a basis for predicting how long the job should run in the future. For example, an estimated duration of the job is set to an average of the measured durations of completed instances of the job executed previously.

A drawback of the solution described above is that it does not provide an accurate prediction of the duration of a new instance of the job. As a consequence, a workload scheduler planning execution of the jobs and controlling their running may operate incorrectly, for example because a latest start time or a deadline time for the jobs are set to a wrong value.

Moreover, when a job runs significantly longer than its estimated duration the workload scheduler may raise alarms or may invoke a workload manager for giving additional system resources to the job (if classified as critical). However, if the duration of the jobs cannot be predicted accurately, alarms are raised even if no error condition occurred or the system resources are used indiscriminately.

It is an object of the present invention to overcome the above-mentioned drawbacks. In order to achieve this object, a method as set out in the first claim is proposed.

DISCLOSURE OF THE INVENTION

Briefly, the present invention provides a method of scheduling execution of a plurality of activities including the steps of estimating a duration of a new instance of each activity to be scheduled as a function of a measured duration of completed instances of the activity executed previously, and adjusting the estimated duration according to the value of at least one attribute of the new instance of the activity.

Moreover, the present invention also provides a computer program for performing the method, a program product storing the program, and a corresponding system.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
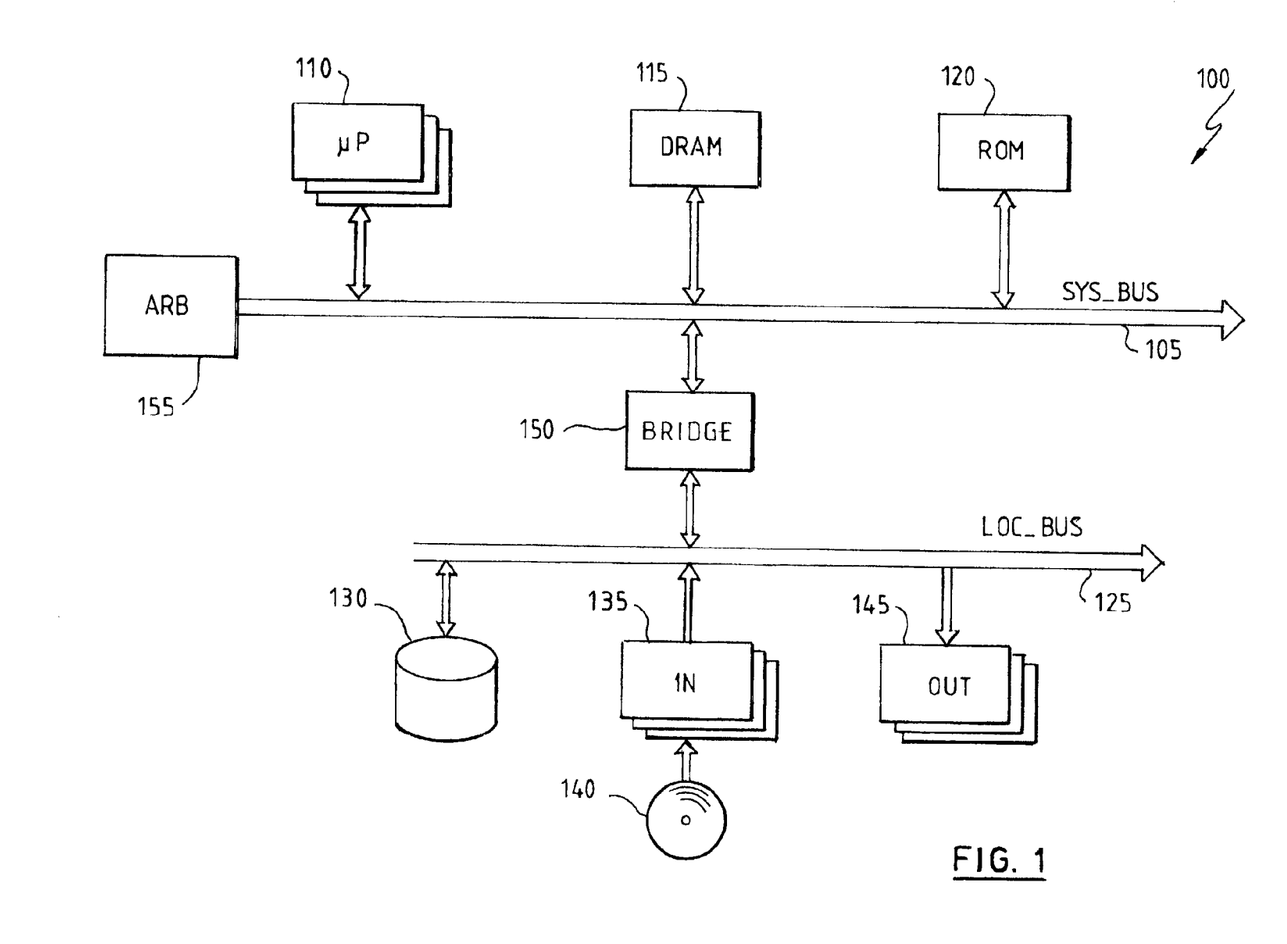
FIG. 1 is basic block diagram of a data processing system in which the scheduling method of the invention can be used.

With reference in particular to FIG. 1, there is shown a data processing system 100, for example a mainframe. The system 100 includes several units, which are connected in parallel to a system bus (SYS_BUS) 105. Particularly, multiple microprocessors ($\mu$P) 110 control operation of the system 100. The microprocessors 110 access a shared working memory 115, generally formed by a DRAM with interleaved modules; a read-only memory (ROM) 120 stores a basic program for starting the system 100.

Various peripheral units are clustered around a local bus (LOC_BUS) 125. More specifically, a bulk memory consists of a hard-disk 130; the system 100 further includes input units (IN) 135, which consist for example of keyboards and drivers for CD-ROMs 140, and output units (OUT) 145, which consist for example of monitors and printers. A bridge unit (BRIDGE) 150 interfaces the system bus 105 with the local bus 125.

Each microprocessor 105 and the bridge unit 150 can operate as master agents requesting an access to the system bus 105 for transmitting information. The granting of the access with mutual exclusion to the system bus 105 is managed by an arbiter (ARB) 155.

Likewise considerations apply if the system has a different structure (for example with a single bus), if it consists of a mini-computer or a network of workstations, if it includes different units (such as drivers for magnetic tapes), and so on.

Figure 2A:
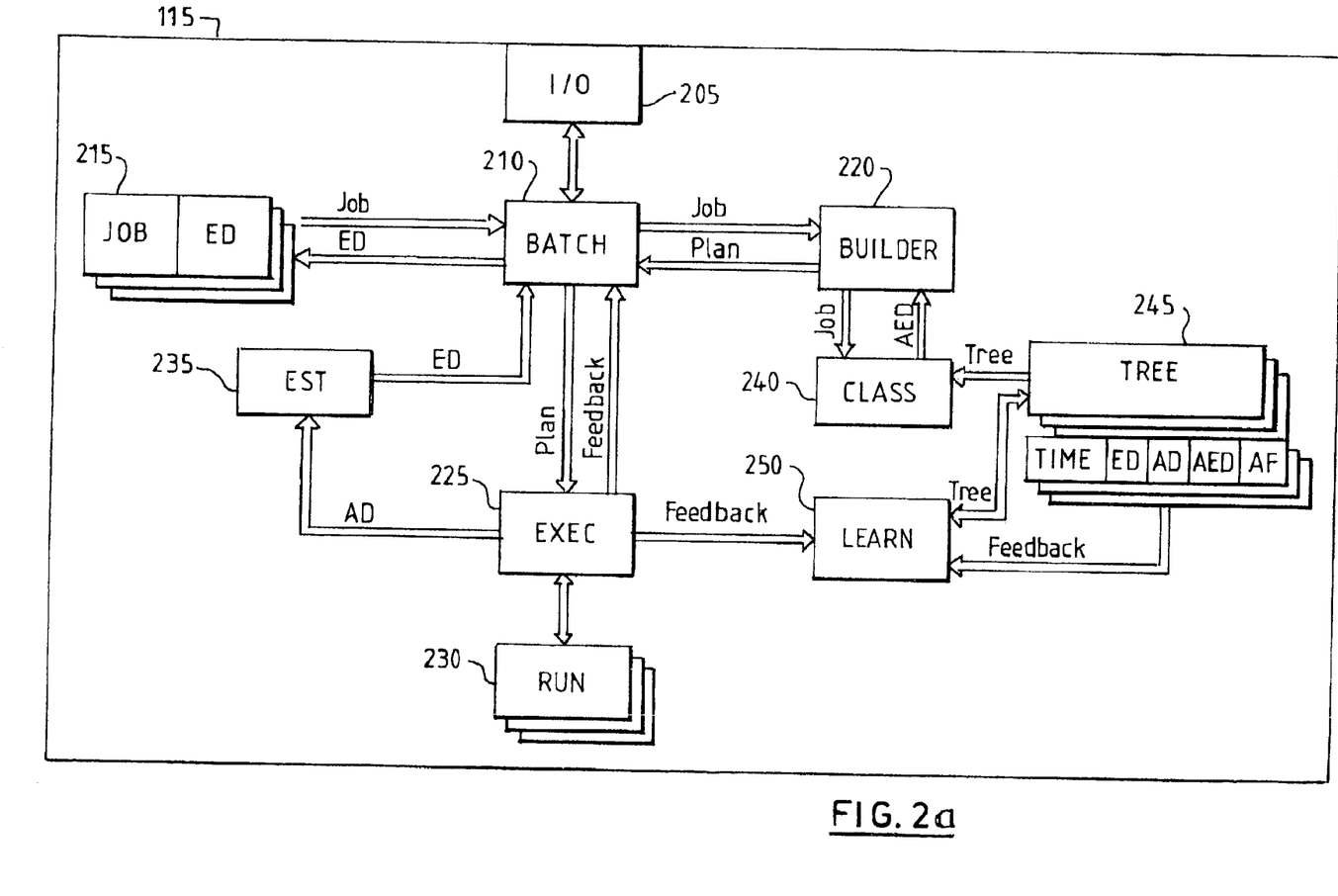
FIG. 2a shows a partial content of a working memory of the system.

Considering now FIG. 2, there is shown a partial content of the working memory 115 of the system in operation; the information (programs and data) is typically stored on the hard-disk and loaded (at least partially) into the working memory when the programs are running, together with an operating system and other application programs (not shown in the figure). The programs are initially installed onto the hard disk from CD-ROM.

The working memory 115 includes an input/output interface (I/O) 205, which is used for exchanging information with an operator. The input/output interface 205 communicates with a batch controller (BATCH) 210. The batch controller 210 manages execution of a series of non-interactive jobs (typically during the evening or whenever the system is idle); batch processing is particularly useful for operations that require the system or a peripheral device for an extended period of time.

The batch controller 210 accesses a database 215, which stores a description of an enterprise production workload. The workload database 215 includes a record (accessed through a respective identifier code) for each job of a batch to be executed on the system. The record is composed of a field (JOB) that describes the operations of the job, a planned time of execution (hour, day, week and month), and any dependency from other jobs. In fact, although the system may execute multiple jobs in parallel by a time sharing technique, several jobs often feature sequential constraints. For example, when a resource (such as a file) to be used by a job is being accessed by another job, it is required that the execution of the job should not be started until after the execution of the other job is completed. The record further includes a field (ED) indicating an estimated duration of the job, which is predicted as described in the following.

The descriptions of the jobs to be executed are provided to the batch controller 210, and then transmitted to a plan builder (BUILDER) 220. The builder 220 creates a scheduling plan for controlling a flow of execution of the jobs in a determined sequence for a specified period; the plan is built according to a pre-set scheduling strategy (for example to balance a system load or to optimise a peak performance). The plan is supplied, through the batch controller 210, to a plan executor (EXEC) 225. The plan executor 225 submits the batch in a production environment (RUN) 230, and controls running of the jobs accordingly.

Once a job terminates its execution (because all the operations have been completed or an error has occurred), feedback information are returned to the batch controller 210 from the plan executor 225; the feedback information includes an actual start time of the job, an actual end time of the job, a return code specifying the result of the operations, and the like. The plan executor 225 also measures an actual duration of the job (AD) by subtracting the actual start time from the actual end time. The actual duration AD is fed into an estimation module (EST) 235; the estimation module 235 uses the actual duration AD for predicting how long the job should run in the future. An algorithm is applied to weight the actual duration AD of each run and to create a continually evolving average for the duration of the job; particularly, the actual duration AD is multiplied by a factor with a value decreasing according to the number of runs of the job, and the result is used for revising the current estimated duration. The revised estimated duration ED is provided to the batch controller 210, and then stored in the corresponding record of the workload database 215.

The plan builder 220 also communicates with a classifier (CLASS) 240. The classifier receives the description of each job to be executed from the plan builder 220, and further accesses a model repository 245. The model repository 245 stores, for each job, a structure defining a decision tree (TREE).

Decision trees are a formalism employed for representing pattern models in classification problems. Classification problems are a branch of a broader scientific discipline known as machine learning, whose scope is the investigation of algorithms that automatically improve their performance at some task through experience (as described for example in "Tom M. Mitchell, Machine Learning, McGraw-Hill, 1997").

Generally, a learning problem is designed by choosing a type of knowledge to be acquired, which is defined by a target function (represented though a chosen formalism), and a corresponding performance measure. The target function is inducted (or learnt) from training experience consisting of known examples of the target function. The learning of the target function involves searching though a space of possible hypotheses to infer the one that best fits the training examples. One common approach is that of defining the best hypothesis as that which minimises an error between values predicted using the target function and the corresponding actual values.

Particularly, classification problems are used for classifying different instances of an event into one of a discrete set of disjoint categories (classes), according to the values of a set of properties (attributes) of each instance of the event. In a classification problem, the target function consists of a classification rule that is used to predict the class of any (hitherto-unseen) new instance of the event from its values of the attributes. The classification rule is typically represented by a decision tree. A (learned) decision tree includes decision nodes specifying a test of some attributes of the event; the branches descending from each node correspond to the possible values of the attribute. Each leaf node specifies the class of the corresponding instances of the event.

An instance of the event is classified (i.e., it is assigned to the corresponding class) by sorting it down the tree from the root to the respective leaf node; more specifically, the process involves testing the attribute specified in the root node, then moving down the branch corresponding to the value of the attribute, and repeating the same operations until a leaf node is reached. The performance of the decision tree is measured as the proportion of the new instances of the event that are correctly classified.

In the example at issue, each class is associated with a corresponding adjustment factor (AF). The adjustment factors (that is the classes to be learnt) are identified in advance and set to a series of values from 0.1 to 10. The adjustment factors are spaced in a non-uniform manner; particularly, a difference between two consecutive adjustment factors from 0.1 to 1 is set to 0.1, while a difference between two consecutive adjustment factors from 1 to 10 is set to 0.5. The decision tree classifies the different instances of the job according to their planned time of execution; particularly, the attributes of the job taken into consideration are an hour of the day, a day of the week, a day of the month, a day of the year, a week of the month, a week of the year, and a month of the year.

For each job to be planned, the classifier 240 assigns the new instance of the job to the corresponding class applying the respective decision tree (according to the description of the job received from the plan builder 220); the adjustment factor AF of the class assigned to the new instance of the job is used to revise its estimated duration ED. Particularly, an adjusted estimated duration AED is calculated multiplying the estimated duration ED by the adjustment factor AF, that is AED=ED*AF. The adjusted estimated duration AED is returned by the classifier 240 to the plan builder 220.

The model repository 245 further includes a log of the feedback information. For each completed instance of the jobs executed previously, the log includes a record (accessed through a respective identifier code) that is composed of a field TIME specifying when the job has been executed, a field AD indicating its actual duration (end time minus start time), a field AED indicating its adjusted estimated duration, and a field AF indicating the (actual) adjustment factor. The adjustment factor AF is calculated dividing the actual duration AD by the estimated duration ED, and rounding off the result to the closest pre-set value of the adjustment factors; for example, if the actual duration is AD=70s and the estimated duration is AF=80s, the adjustment factor will be AF=AD/ED=70/80=0.875≅0.9.

The information stored in the model database 245 is updated by a learning module (LEARN) 250. Particularly, the learning module 250 stores the feedback information provided by the execution module 225 and revises the respective decision tree accordingly. The decision tree is built using the feedback information of the completed instances of the job as training examples.

The learning module 250 employs an algorithm operating either in a non-incremental mode or in an incremental mode. When the learning algorithm operates in a non-incremental mode, the decision tree is built from scratch, based on the entire set of available feedback information accumulated in the model repository 245.

The decision tree is preferably built selecting, for each node, the attribute that better separates the completed instances of the job alone; this brings about selection of the simplest decision tree, which is preferred on the ground that it is more likely to capture some meaningful relationship between a job's class and its values of the attributes (according to the so-called Occam's razor). A quantitative measure of the worth of an attribute is for example an information gain, which defines the reduction in entropy caused by partitioning the completed instances of the job according to this attribute, and a split information, which is sensitive to how broadly and uniformly the attribute splits the completed instances of the job. The process is carried out for each node, until either every attribute has been included along the respective path through the tree or the completed instances of the job associated with the node all have the same adjustment factor (that is their entropy is zero). An algorithm of this type is described in "J. R. Quinlan, Induction of Decision Trees", Machine Learning Review, vol. 1, pp. 81–106, Kluwer Publishers, 1986".

Conversely, when the learning algorithm operates in an incremental mode, the decision tree is revised in response to each newly observed instance of the job. At the beginning, when a first instance of the job is observed, the decision tree is built as a leaf node indicating the adjustment factor associated with the first instance of the job; the corresponding feedback information is saved at the leaf node. Whenever a further instance of the job is to be incorporated, the decision tree is followed according to the attributes of the further instance of the job, as far as a leaf node is reached. If the further instance of the job belongs to the same class as the leaf node, it is simply added to the set of instances of she job saved at the leaf node. Conversely, the algorithm attempts to turn the leaf node into a decision node; the instances of the job saved at the leaf node just converted to a decision node are then incorporated recursively down their proper branch according to the new test. Preferably, the tree is also restructured as necessary so that the best test attribute is at each decision node. It should be noted that, although the feedback information of the various instances of the job is retained within the decision tree structure, it is only used for restructuring purposes, and is not reprocessed each time a new instance of the job is observed. An algorithm of this type is described in "Paul E. Utgoff, Incremental Induction of Decision Trees, Machine Learning Review, vol. 4, pp. 161–186, Kluwer Publisher, 1989" and "Paul E. Utgoff, Decision Tree Induction Based on Efficient Tree Restructuring, Machine Learning Review, vol. 29, pp. 5–44, 1997".

Figure 2B:
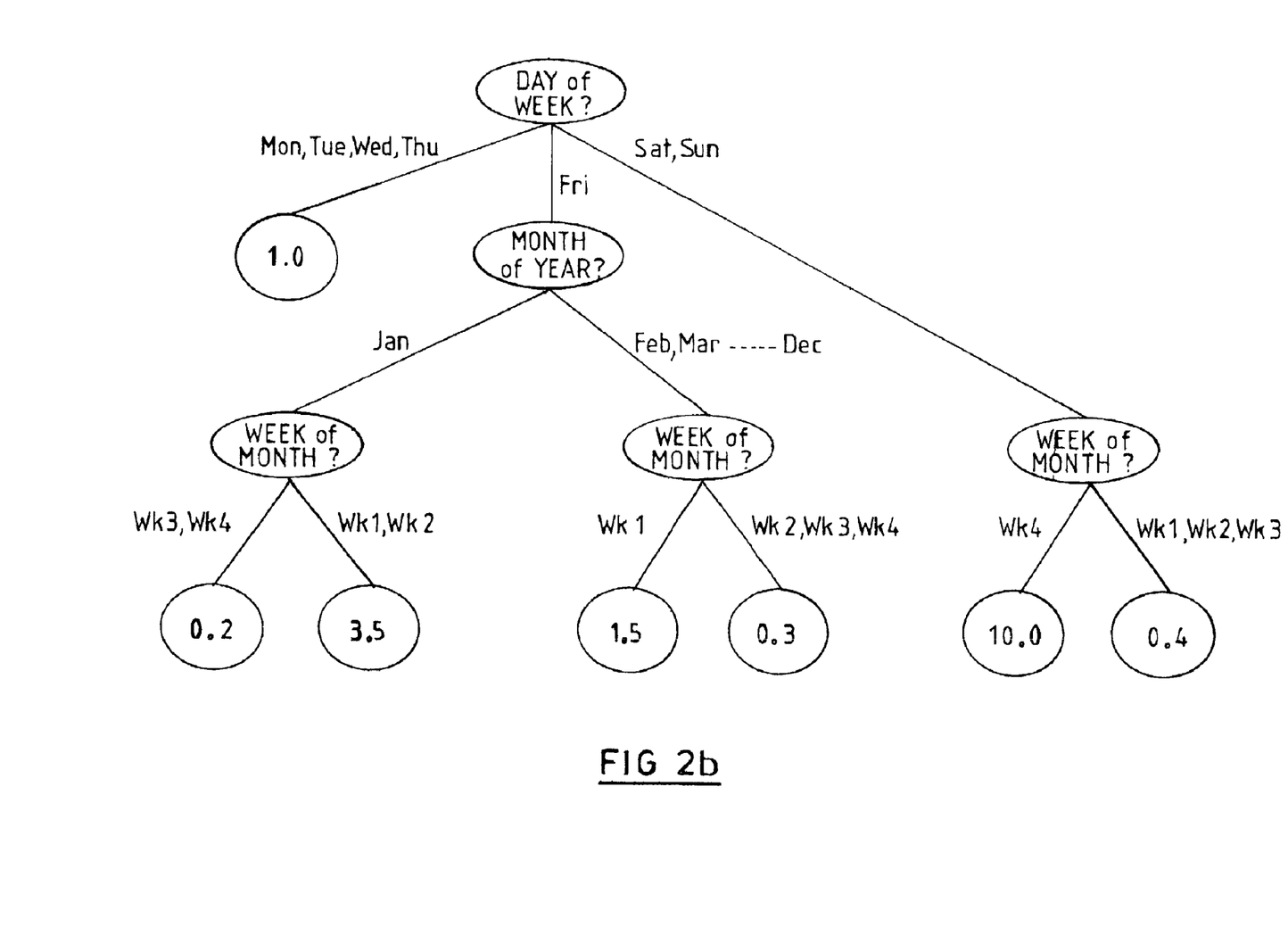
FIG. 2b depicts an example of a decision tree used by the scheduling method.

An example of the decision tree used by the scheduling method of the invention is shown in FIG. 2b. The decision tree includes a root node based on the day of week in which the job runs. The job duration is, constant on Monday through Thursday (irrespective of the value of the other attributes). On Saturdays and Sundays the job duration is less than the running average (adjustment factor AF=0.4), except on the last week of the month (WK4) when the job is very long-running (adjustment factor AF=10). When the job runs on Fridays, its duration varies both on the month and on the week of the month.

If we apply this decision tree to a new instance of the job planned to be executed at the following time:

Hour of day=8
Day of week=Friday
Day of month=9
Month of year=January
Week of month =WK2
the classifier goes through the various nodes of the decision tree and finds that the class of the new instance of the job has an adjustment factor AF=3.5. Its estimated duration (for example ED=120s) is then multiplied by the adjustment factor to provide the more accurate adjusted estimated duration AED=ED*AF=120*3.5=420s.

The performance of the algorithm is measured by a prediction error ERR %, which is defined as the percentage of an absolute value of the difference between the adjusted estimated duration of each instance of the job and its actual duration with respect to the actual duration (ERR %=|AED−AD|*100/AD).

Likewise considerations apply if a whole scheduling program (consisting of the plan builder, the estimation module, the classifier and the learning module) and the data are structured in a different manner, for example if the workload database and the model repository consist of a single inventory or they are replaced by equivalent memory structures, if different functions are provided, if the estimated duration is predicted in a different manner (for example accumulating the actual duration of each completed instance of the job and calculating their actual running average, or more generally as a function of the measured duration of each completed instance of the job), and so on.

Figure 3A:
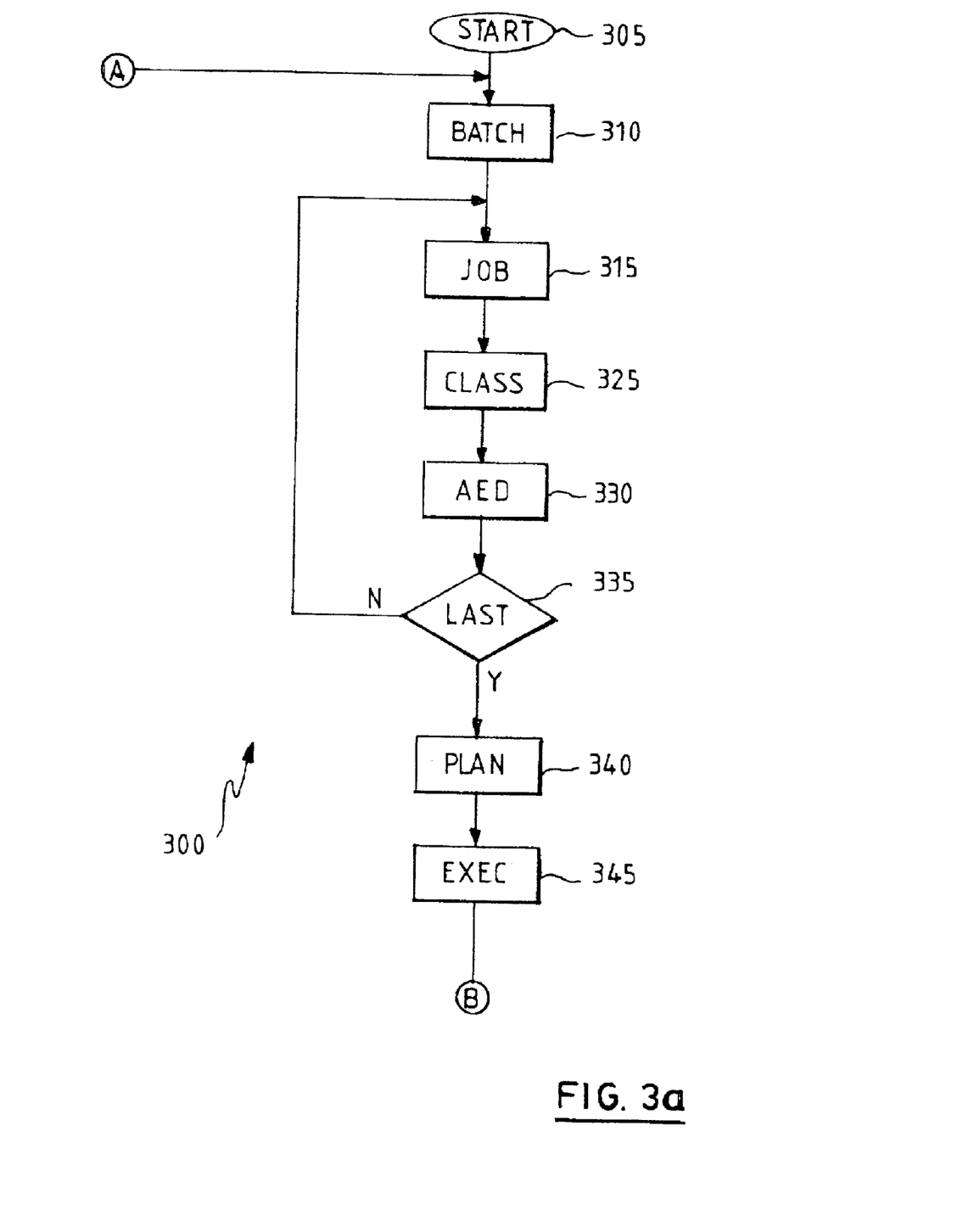
FIGS. 3a–3b are a flow chart of the scheduling method implemented in the system.
Figure 3B:
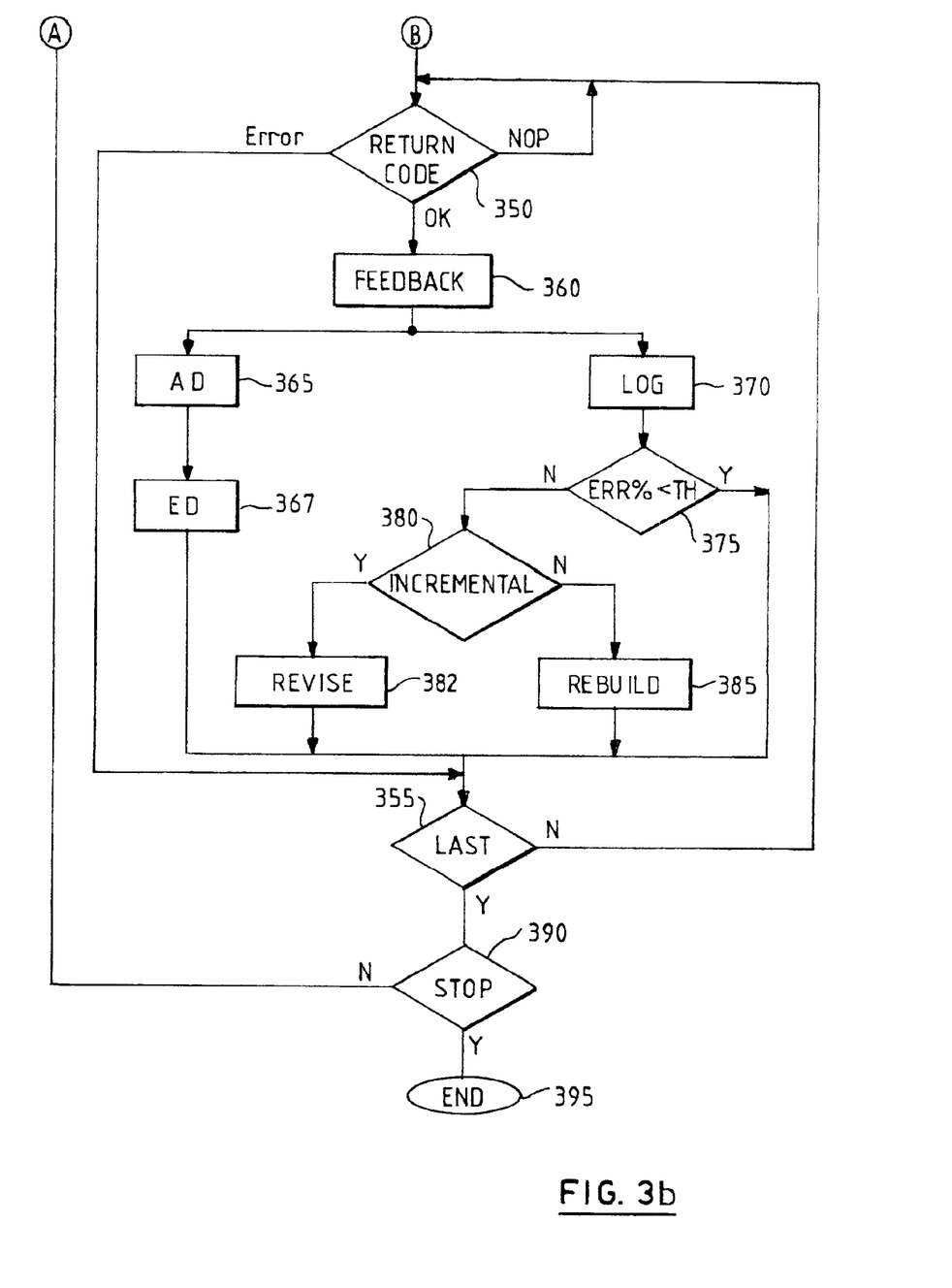

With reference now to FIGS. 3a–3b, the scheduling program (when running on the system) performs a method 300 that starts at block 305. The method then passes to block 310, wherein the operator requires building of a scheduling plan for a selected batch of jobs. Passing to block 315, the descriptions of the jobs to be executed are retrieved from the workload database by the batch controller, and then transmitted to the plan builder.

The plan builder passes the description of a first job of the batch to the classifier at block 325. The classifier assigns the new instance of the job to the corresponding class applying the respective decision tree stored in the model repository (according to its planned time of execution). The adjustment estimated duration AED for the new instance of the job is calculated at block 330 multiplying the respective estimated duration ED by the adjustment factor AF of the class assigned to the new instance of the job; the adjusted estimated duration AED is then returned to the plan builder. The method checks at block 335 whether a last job of the batch has been processed. If not, the method returns to block 315 for repeating the operations described above. Conversely, the method descends into block 340.

Considering now block 340, the builder creates the scheduling plan for controlling execution of the jobs according to their adjusted estimated duration; the plan is returned to the batch controller and then passed to the plan executor. The executor submits the plan at block 345, and controls running of each job according to its planned time of execution. The method then enters an idle loop at block 350, waiting for termination of a job execution. If the return code of the job specifies that an error has occurred, the method descends into block 355 (described in the following). Conversely, if the job has been executed correctly the method continues to block 360, wherein the feedback information of the job is returned to the plan executor.

The method then forks into two branches that are executed in parallel. A first branch consists of blocks 365–367, and a second branch consists of blocks 370–385; the two branches joint at block 355.

Considering now block 365, the plan executor calculates the actual duration AD of the job (actual end time minus actual start time), which is supplied to the estimation module. The estimation module revises the estimated duration accordingly at block 367; the revised estimated duration ED is then provided to the batch controller and stored in the workload database.

At the same time, at block 370, the feedback information is supplied to the learning module and logged into the model repository. The method checks at block 375 whether the prediction error for the job reaches a threshold value, for example 10%. If the prediction error is lower than the threshold value, the method continues to block 355 directly. Conversely, if the prediction error exceeds the threshold value (or it is equal thereto) the method checks at block 380 whether the operator has selected an incremental mode of operation. If so, the method continues to block 382 wherein the decision tree is revised in the incremental mode according to the feedback information of the job that has been just executed; conversely, the method proceeds to block 385, wherein the decision tree is rebuilt using the feedback information of all the completed instances of the job logged in the model repository. In both cases, the method then descends into block 355.

Considering now block 355, the batch controller checks whether a last job of the plan has been executed. If not, the method returns to block 350, waiting for termination of a further job. On the contrary, the method verifies at block 390 whether the scheduling program has been stopped. If not, the method return to block 310 for repeating the steps described above. Conversely, the method ends at the final block 395.

Likewise considerations apply if the program performs an equivalent method, for example with error routines, escape functions for stopping execution of the jobs, monitoring routines for tracking the jobs, and the like.

More generally, the present invention provides a method of scheduling execution of a plurality of activities. The method includes the steps of estimating a duration of a new instance of each activity to be scheduled as a function of a measured duration of completed instances of the activity executed previously, and adjusting the estimated duration according to the value of at least one attribute of the new instance of the activity.

The devised solution results in a very accurate prediction of the duration of a new instance of each job. This improves operation of the workload scheduler, which generates more reliable scheduling plans. As a consequence, any alarm raised by the workload scheduler always indicates an error condition, due to a job running significantly longer than its estimated duration. The system resources may also be used correctly by the workload manager for critical jobs that run longer than their estimated duration.

In fact, the inventors have discovered that the various instances of a same job are not always equal; conversely, the duration of the different instances may vary widely due to consistently repeatable factors. The method of the invention recognises the combination of circumstances that can alter the duration of each instance of the job; the estimated duration of a new instance the job is then adjusted taking into account some key information thereof.

The preferred embodiment of the invention described above offers further advantages. For example, the method inducts a pattern model that partitions the completed instances of each job into classes defining corresponding adjustment factors; a new instance of the job is assigned to the corresponding class applying the pattern model, and the estimated duration is corrected according to the adjustment factor of the assigned class. In this way, historical information is used to identify repeatable factors that alter the job duration; moreover, the performance of the algorithm may be improved through experience. Preferably, the pattern model is represented by a decision tree; this formalism is particular simple, and at the same time very accurate.

Similar considerations apply if the decision tree has a different structure (with one or more decision nodes and a plurality of leaf nodes), if the pattern model is inducted in a different manner, for example using training examples prepared by an expert, if a different procedure is used for adjusting the estimated duration, and the like. However, the method of the invention leads itself to be carried out even representing the pattern model with different formalisms (for example neural networks, polynomial or linear functions, Bayesian networks), if the adjusted estimated duration is not determined using a classification rule (for example it is calculated using a different target function of a generic learning algorithm), or even if the estimated duration is simply adjusted according to the value of one or more attributes of the new instance of the job (for example using a pre-set adjustment table).

The decision tree is revised or rebuilt when the prediction error reaches a threshold value; in this way, the accuracy of the method is always kept at a desired level. Advantageously, the decision tree is learnt using an algorithm operating in an incremental mode. The incremental mode is preferred for a serial learning task (based on a stream of observed examples), since it is more efficient to refine the decision tree as new training examples become available than to generate a new decision tree each time a new training example is observed.

Likewise considerations apply if the learning algorithm operates in a different manner (for example without storing the feedback information at each node for restructuring the decision tree, or incorporating a newly observed instance of the job only if the existing decision tree would misclassify it), if the decision tree is built with other techniques (for example pruning the decision tree for avoiding over-fitting due to noise or coincidental regularities in the training examples), if the threshold value is different, and so on. Alternatively, the decision tree is rebuilt periodically (for example every week), or the learning algorithm operates only in the incremental mode or in the non-incremental mode.

Advantageously, the adjustment factors are set to a series of values from 0.1 to 10. Experimental results have shown these limit values provide a good accuracy of the scheduling method. In fact, extremely short-lived jobs (performing simple operations, such as copying a file, or consisting of dummy jobs used to synchronise other jobs) may vary in duration from one instance to the other, even by large factors; however, the actual duration is always a very small unit of time, so that the variance is relatively uninteresting for planning purposes. Similarly, long running jobs (for example daemon processes) do not have successor dependencies (i.e., no jobs are triggered by their completion); therefore, the estimated duration for these jobs is again relatively uninteresting when building the plan.

Moreover, the adjustment factors are spaced in a non-uniform manner, with the difference between two consecutive adjustment factors that increases with their value. In this way, the adjustment of the estimated duration has a resolution that is high when the duration of the new instance of the job is close to the estimated one; on the other hand, the resolution decreases as far as the duration of the new instance of the job varies by a large factor with respect to the estimated one, since a very accurate prediction is less interesting in this case.

Similar considerations apply if the adjustment factors are spaced in a different manner, for example with the difference between two consecutive adjustment factors that is proportional to their average. However, the solution of the invention leads itself to be carried out even with the adjustment factors uniformly spaced, with the adjustment factors set to different values, or with the adjustment factors, their spacing and/or the limit values that may be customised by the operator to allow tuning to a particular purpose.

Preferably, the decision tree is built using the actual time of execution of the completed instances of the job, while each new instance of the job is classified taking into consideration its planned time of execution. In fact, these attributes are particularly suitable to recognise the combinations of circumstances that in the past have altered the execution of the job; therefore, they provide a quite accurate prediction of the job duration. For instance, a daily job that processes bank transactions to update a central database may run longer towards the end of the month, when more people use banks to pay bills, deposit or withdraw salary, pay mortgages, and so on. Likewise, it is probable that this job will take less time at weekends when branch offices are closed than it would on weekdays when there are more transactions to process.

Similar considerations apply if the planned/actual time of execution is defined by different parameters, such as only the day of the week and the day of the month. However, the method according to the present invention leads itself to be implemented even taking into consideration one or more different attributes of the job, such as the number of jobs concurrently executed on the system or a microprocessor load at its planned/actual time of execution.

In the preferred embodiment of the invention, the method is used for scheduling execution of jobs in a batch processing. However, different applications of the devised solution are not excluded, such as for controlling system resources in a distributed computer network.

Advantageously, the solution according to the present invention is implemented with a computer program (software), which is provided on CD-ROM.

Alternatively, the program is provided on floppy-disk or tape, is pre-loaded onto the hard-disk, or is stored on any other computer readable medium, is sent to the system through a network (typically the INTERNET), is broadcast, or more generally is provided in any other form directly loadable into a working memory of the computer. However, the method according to the present invention leads itself to be carried out even with a hardware structure, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

What is claimed is:

1. A computer implemented method of scheduling execution of a plurality of activities including the steps of:
    estimating a duration of a new instance of each activity to be scheduled as a function of a measured duration of completed instances of the activity executed previously, and
    adjusting the estimated duration according to the value of at least one attribute of the new instance of the activity;
    wherein the step of adjusting the estimated duration includes:
        inducting a pattern model partitioning the completed instances of the activity into a plurality of classes according to the value of at least one corresponding attribute, each class defining an adjustment factor;
        assigning the new instance of the activity to a corresponding class applying the pattern model; and
        calculating the adjusted estimated duration multiplying the estimated duration by the adjustment factor of the class assigned to the new instance of the activity.

2. The method according to claim 1, wherein the pattern model is represented by a decision tree having at least one decision node specifying an attribute test and a plurality of leaf nodes each one specifying a corresponding class.

3. The method according to claim 2, further including the steps of executing the new instance of the activity, and selectively rebuilding the decision tree or revising the decision tree according to an actual duration of the executed new instance of the activity when a prediction error for the executed new instance of the activity reaches a threshold value.

4. The method according to claim 1, wherein the adjustment factors are set to a series of values from 0.1 to 10.

5. The method according to claim 4 wherein the adjustment factors are spaced in a non-uniform manner, a difference between two consecutive adjustment factors increasing with the value of the corresponding adjustment factors.

6. The method according to claim 1, wherein the at least one attribute of the new instance of the activity includes an indication of a planned time of execution and the at least one corresponding attribute of each completed instance of the activity includes an actual time of execution.

7. The method according to claim 1, wherein the activities consist of jobs of a batch processing.

8. A computer program in a working memory of a computer, said program for performing the method of claim 1 when the program is run on the computer.

9. A program product comprising a computer readable medium on which the program of claim 8 is stored.

10. The computer program according to claim 8, wherein the pattern model is represented by a decision tree having at least one decision node specifying an attribute test and a plurality of leaf nodes each one specifying a corresponding class.

11. The computer program according to claim 8, wherein the method of claim 1 further includes the step of executing the new instance of the activity, and selectively rebuilding the decision tree or revising the decision tree according to an actual duration of the executed new instance of the activity when a prediction error for the executed new instance of the activity reaches a threshold value.

12. A system for scheduling execution of a plurality of activities, said system implemented in a data processing system, and including:
    means for estimating a duration of a new instance of each activity to be scheduled as a function of a measured duration of completed instances of the activity executed previously; and
    means for adjusting the estimated duration according to the value of at least one attribute of the new instance of the activity;
    wherein the means for adjusting the estimated duration is further adapted to:
        induct a pattern model partitioning the completed instances of the activity into a plurality of classes according to the value of at least one corresponding attribute, each class defining an adjustment factor;
        assign the new instance of the activity to a corresponding class applying the pattern model; and
        calculate the adjusted estimated duration multiplying the estimated duration by the adjustment factor of the class assigned to the new instance of the activity.

13. A system for scheduling execution of a plurality of activities, said system implemented in a data processing system, and including:
    a first software module for estimating a duration of a new instance of each activity to be scheduled as a function of a measured duration of completed instances of the activity executed previously, and a second software module for adjusting the estimated duration according to the value of at least one attribute of the new instance of the activity;

wherein the second software module is further adapted to:
induct a pattern model partitioning the completed instances of the activity into a plurality of classes according to the value of at least one corresponding attribute, each class defining an adjustment factor;
assign the new instance of the activity to a corresponding class applying the pattern model; and
calculate the adjusted estimated duration multiplying the estimated duration by the adjustment factor of the class assigned to the new instance of the activity.

14. The system according to claim 13, wherein the pattern model is represented by a decision tree having at least one decision node specifying an attribute test and a plurality of leaf nodes each one specifying a corresponding class.

15. The system according to claim 14, further including a third software module for executing the new instance of the activity, and selectively rebuilding the decision tree or revising the decision tree according to an actual duration of the executed new instance of the activity when a prediction error for the executed new instance of the activity reaches a threshold value.

16. The system according to claim 13, wherein the adjustment factors are set to a series of values from 0.1 to 10.

17. The system according to claim 16 wherein the adjustment factors are spaced in a non-uniform manner, a difference between two consecutive adjustment factors increasing with the value of the corresponding adjustment factors.

18. The system according to claim 13, wherein the at least one attribute of the new instance of the activity includes an indication of a planned time of execution and the at least one corresponding attribute of each completed instance of the activity includes an actual time of execution.

19. The system according to claim 13, wherein the activities consist of jobs of a batch processing.

* * * * *